United States Patent [19]
Hubel

[11] 4,181,292
[45] Jan. 1, 1980

[54] BARRICADE BRACKET

[76] Inventor: Clayton F. Hubel, 5409 Glenn Ave., Flint, Mich. 48505

[21] Appl. No.: 882,237

[22] Filed: Feb. 28, 1978

[51] Int. Cl.² .................... A01G 17/06; E04H 17/00
[52] U.S. Cl. ............................ 256/23; 403/232.1; 182/181; 108/108; 256/65
[58] Field of Search ........... 256/23, 64, 65, DIG. 4, 256/DIG. 6; 403/49, 235, 237, 232.1; 182/151, 181, 185, 129; 248/214, 224.3, 243; 116/63 P; 108/108, 109, 111

[56] References Cited
U.S. PATENT DOCUMENTS

| 1,838,151 | 12/1931 | Penote | 182/181 X |
| 1,998,520 | 4/1935 | Penote | 256/64 |
| 2,319,893 | 5/1943 | Tuttle | 182/129 X |

FOREIGN PATENT DOCUMENTS

| 56161 | 5/1967 | Fed. Rep. of Germany | 108/108 |
| 1229258 | 9/1960 | France | 108/109 |

*Primary Examiner*—Wayne L. Shedd
*Attorney, Agent, or Firm*—Basile and Weintraub

[57] ABSTRACT

A barricade bracket and barricading system therefor is disclosed herewithin as being constituted by a barricade board angularly disposed with respect to a second barricade board. The barricade boards are interconnected by a bracket defined by a first member which slips over one of the boards and a second member integrally formed with the first member which slidingly receives the second board therewithin. The bracket hereof provides a fast interconnection which renders a barricade system stable.

9 Claims, 3 Drawing Figures

BARRICADE BRACKET

BACKGROUND OF THE INVENTION

1. Field of the Invention

The present invention pertains to brackets. More particularly, the present invention pertains to brackets for angularly interconnecting boards or similar structure. Even more particularly, the present invention pertains to brackets for rendering fast and interconnecting barricade boards, as well as a barricade system derived therefrom.

2. Prior Art

In erecting barricades about manholes and the like, it is conventional to merely place barricade boards on a pedestal or the like and to ring such barricade boards about the hazard. In order to provide some stability to such barricade systems, occasionally, a plurality of such boards may be interconnected or interrelated by wiring the barricades together at some angular disposition, such as perpendicular or the like. Furthermore, usually the barricades are wired to some permanent structure, such as a sign post or the like in order to be able to circumvent the knocking over of the barricades as is occasioned through high winds, vehicles crashing thereinto and the like. Such encounters often result in the destruction of the barricade boards, as well as signs, flags and the like which are affixed thereto.

Another problem which is often encountered is the safety to the populous. Oftentimes, due to vehicles crash, inclement weather and the like, barricades are blown over. As heretofore noted, they are merely emplaced on the ground through pedestals or the like and, therefore, subject to being knocked over by vehicles, wind and so forth. Thus, the entire premise for erecting the barricade about a manhole cover or the like is lost. Thus, an unsuspecting person can easily suffer the pratfalls of encountering the danger or obstacle heretofore protected by the barricade.

Unfortunately, and to the best of applicant's knowledge, heretofore little attention has been directed to providing a stable barricading structure which would enable the erection of a stable barricade system which could easily ring the obstacle sought to be overcome. As will subsequently be detailed, the present invention provides a bracket which enables interconnection between barricade boards and the resulting system therefrom which renders such systems stable and resistant to high winds, as well as vehicle encounters and the like.

STATEMENT OF RELEVANT ART

As heretofore noted, applicant is unaware of any art relevant hereto.

SUMMARY OF THE INVENTION

In accordance with the present invention, there is provided a bracket for interconnecting, in an angular relationship, barricade boards. The bracket hereof comprises a first member or section which envelopes a first board and a second member which slidingly, insertingly receives one end of a second board. The second member of the bracket is integrally formed with the first member thereof. This integral relationship between the elements of the bracket thereby renders fast and interconnection between boards, and in particular, barricade boards, associated therewith.

The present invention, also, contemplates the formation of a barricade system which comprises a plurality of barricade boards which are interconnected via the barricade brackets hereof.

For a more complete understanding of the present invention, reference is made to the following detailed description and accompanying drawing. In the drawing, like reference characters refer to like parts throughout the several views in which:

DESCRIPTION OF THE PREFERRED EMBODIMENT

Figure 1:
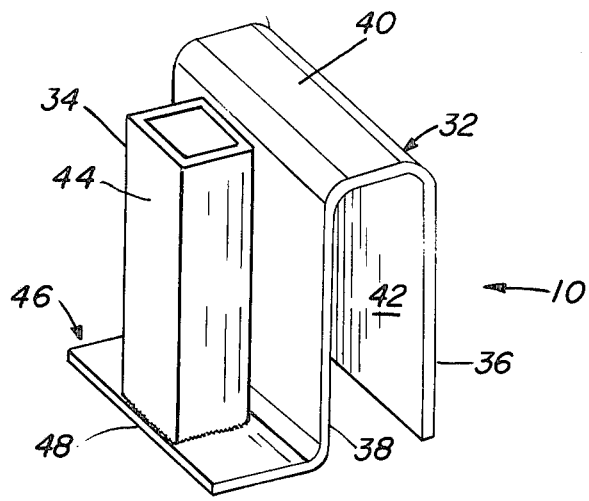
FIG. 1 is a perspective view of a barricade bracket in accordance with the present invention.

Now, and with reference to the drawing, there is depicted therein a barricade bracket, generally, denoted at 10 and a barricade system, generally, denoted at 12, derived therefrom. The barricade system 12 is derived by interconnecting at least a pair of barricade boards 14, 16, via the bracket 10 hereof.

At the outset, it is to be noted that as used herein the term "barricade board" defines a board 14 or 16 which is utilized to erect a barricade about an excavation, hole or other terrain-oriented obstruction which would otherwise create a hazardous encounter to a person. Such barricade boards generally comprise elongated members, usually, formed of wood or similar material. Secured to each end of the board is a U-shaped cap 18. The cap has a pair of opposite, spaced apart, parallel legs 20, 22, respectively, and an interconnecting bight section 24. As clearly shown in FIGS. 2 and 3, the cap is secured to the ends of the board. The legs have a width substantially equal to the height of the board 14 or 16 associated therewith. Furthermore, the distance between the legs is substantially equal to that of the width of the board. Thus, each leg 20 or 22 abuts against a side of the board, as shown. Fastening means, such as rivets 26 are used to fasten the cap to the end of the board associated therewith. It will be noted that there is a gap or opening 28 which is defined by the distance between the end of the board and the bight section 24. The opening 28 is adapted, in the prior art, to receive wires, leg pedestals 30 or the like slidingly insertingly therewithin. When not utilized in the practice of the present invention, such functions remain.

It is to be understood that this construction of a barricade bracket is conventional within the prior art and, per se, does not form part of the invention hereof.

Referring now to FIG. 1, there is depicted therein the barricade bracket 10 hereof. The bracket 10 hereof comprises a first section or element 32 and a second section or element 34 integrally formed therewith.

The first element 32 substantially comprises a U-shaped portion having first and second legs 36, 38. The legs 36, 38 are parallel, co-extensive and spaced apart. A bight section 40 interconnects the legs 36, 38 at one end thereof. The space 42 between the interior, opposed surfaces of the legs 36, 38 has a width substantially slightly larger than that of the width of a barricade board 14 or 16. This enables the first element 32 to be slid over the top of the board such that the interior surface of the leg 40 rests or abuts against the top of the board 14 or 16, as shown. Thus, the first element 32 is configured to be slid over and envelop a portion of a first barricade board.

The second element 34 is configured to be slidably received within the opening or space 28 defined between the end of the barricade board and the interior surface of the bight section 24 of the end cap 18. Thus, the element 34 has a configuration similar to that of the configuration of the opening 28. For convenience and standardization, a rectangular configuration of the element 34 is preferred.

The element 34 is defined by a substantially rectangular tubular member 44.

The tubular member 44 has a diameter slightly less than that of the space 28 to enable the tubular member to be slidingly inserted thereinto.

The elements 32 and 34 are rendered integral via interconnecting means 46. Radially extending outwardly from one of the legs 36, 38 of the first element 32 is a ledge or flange 48. The ledge 48 is substantially perpendicular to the leg from which it radiates, leg 38 being shown in the drawing. The ledge or flange 48 defines the means 46. As shown in FIG. 1, the tubular member 44 defining the second element 34 is affixed to the ledge 48 and extends upwardly therefrom. The tubular member 44 has a height substantially equal to or slightly less than that of the leg 38. A gap exists between the outer surface of the leg 38 and the wall of the tubular member 44 closest thereto. The gap enables the bight section 24 of the end cap 18 to be nested thereinto.

It is to be, thusly, perceived that the second element is deployed by inserting the element into the space 28.

The tubular element 44 has a width less than that of the leg 38 or the ledge 48 upon which the element seats.

The second element 34 is affixed to the interconnecting means 46 via any suitable mode such as welding or the like.

In fabricating the present bracket, any suitable material of construction, such as iron, steel, aluminum or the like can be used.

In deploying the present bracket to provide a barricade system, the first element is slid over a first barricade board and, thereafter, the end cap portion of a second board is disposed such that the tubular element 44 is slidably inserted into the space by dropping the barricade board downwardly.

Figure 2:
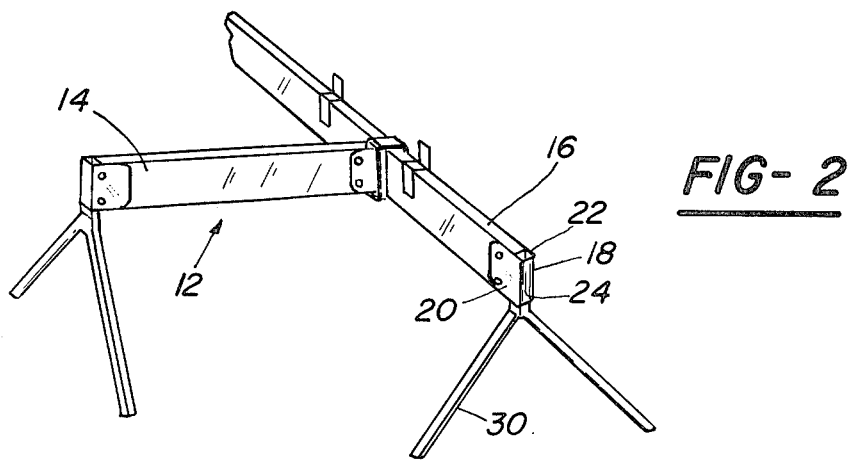
FIG. 2 is a perspective view of a barricade system using the barricade bracket hereof.
Figure 3:
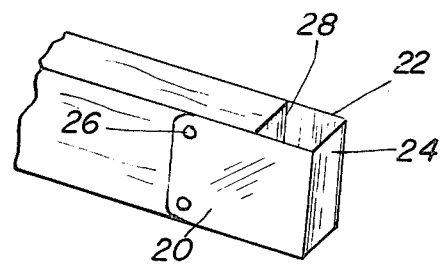
FIG. 3 is a broken perspective view of the end of a bracket board utilized herein.

In assembling a barricade system conventionally the two barricade boards are disposed substantially perpendicular to each other, as shown in FIG. 2.

The free ends of the boards may have the pedestals 30 inserted thereinto. However, and in accordance with the present invention, by virtue of the disposition of the present bracket, the two boards are interconnected in a rigid and stable mode. Furthermore, the system erected can readily be disassembled by demounting the bracket from the interconnected boards.

It is to be appreciated from the preceding that there has been described herein a barricade bracket and barricade system derived therefrom which is stable, rigid and provides a safe and secure means for barricading an excavation or the like.

Having, thus, described the invention what is claimed is:

1. In a barricading system of the type wherein barricading boards emplaced about hazards are provided with end caps on at least one end thereof said end caps comprising parallel legs and an interconnecting bight, a space being defined between the end cap and the end of the barricading board, a bracket for interconnecting at least two barricade boards in an angular relationship, comprising:
   (a) a first element associated with and adapted to be slid over a first barricade board, and
   (b) a second element laterally removed from said first element, adapted to be slidingly inserted into the space defined between the end cap and the end of the second board.

2. The barricade bracket of claim 1 wherein the first element comprises a substantially U-shaped member having first and second spaced apart, parallel legs and an interconnecting bight portion, and
   wherein the U-shaped section slides onto said first board associated therewith such that the interior surface of the bight section abuts against the top of the board associated therewith.

3. The barricade bracket of claim 1 wherein:
   the second element comprises an elongated member having a configuration similar to that of the space defined between the end cap and the end of the barricade board associated therewith such that the second element can be inserted into the space.

4. The barricade bracket of claim 3 wherein:
   the space has a substantially rectangular configuration and the second element comprises a substantially rectangular tubular member having a diameter less than that of the space to enable the tubular member to be inserted thereinto.

5. The barricade bracket of claim 1 which further comprises:
   means interconnecting the first and second elements of the bracket.

6. The barricade bracket of claim 1 wherein:
   the first element comprises a substantially U-shaped member having first and scond spaced apart, parallel legs and an interconnecting bight portion,
   the second element comprises an elongated member having a configuration similar to that of the space defined between the end cap and the end of the barricade board associated therewith such that the second element can be inserted into the space, and
   wherein the U-shaped section slides onto the board associated therewith such that the interior surface of the bight section abuts against the top of the board associated therewith.

7. The barricade bracket of claim 6 which further comprises:
   means for interconnecting the first and second elements.

8. A barricade system comprising:
   at least a pair of barricade boards angularly disposed with respect to each other and means for interconnecting the boards, the interconnecting means comprising the bracket of claim 1.

9. In a barricading system of the type wherein barricading boards emplaced about hazards are provided with end caps on at least one end thereof said end caps comprising parallel legs and an interconnecting bight, a space being defined between the bight and the end of the barricading board, a bracket for interconnecting at least two barricade boards in angular relationship, comprising:
   (a) a first element associated with and adapted to be slid over a first barricade board, and comprising a substantially U-shaped member having first and second spaced apart, parallel legs and an interconnecting bight portion, the U-shaped section sliding onto the board associated therewith such that the interior surface of the bight section abuts against the top of the board associated therewith, (b) a second element adapted to slidingly inserted into the space defined between the end cap bight and the end of the second board; and comprising an elongated member having a configuration similar to that of the space defined between the end cap and the end of the barricade board associated therewith such that the second element can be inserted into the space, and (c) means for interconnecting the first and second elements; and (d) a ledge formed at the free end of one of the legs of the U-shaped member and extending radially outwardly therefrom, the ledge defining the means for interconnecting and, wherein the second element is affixed to the ledge and extends upwardly therefrom.

* * * * *